Dec. 3, 1963   J. F. NORTON   3,112,758
BALL VALVE
Filed Jan. 6, 1961   3 Sheets-Sheet 1
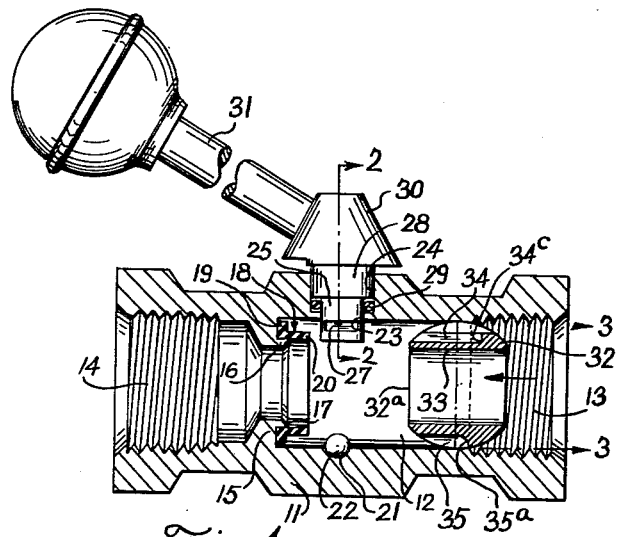
Fig.1
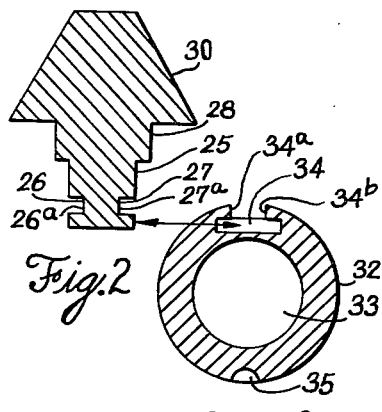
Fig.2
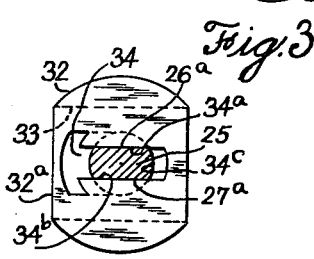
Fig.3
Fig.4
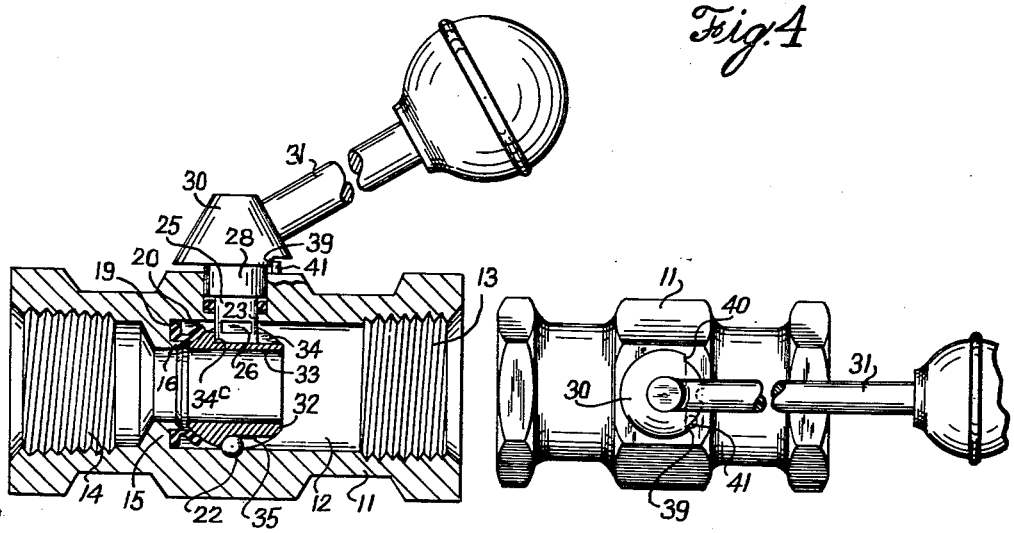
Fig.5
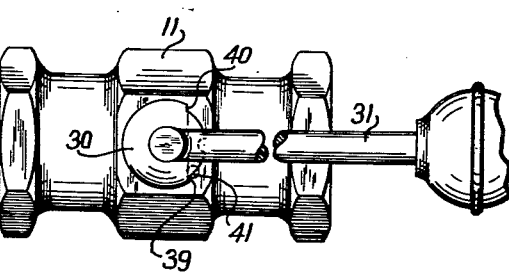
Fig.6
INVENTOR.
JAMES FREDERICK NORTON
BY
RICHEY, McNENNY & FARRINGTON
Donald W. Farrington
ATTORNEYS Dec. 3, 1963   J. F. NORTON   3,112,758
BALL VALVE Filed Jan. 6, 1961   3 Sheets-Sheet 2

INVENTOR.
JAMES FREDERICK NORTON
BY
RICHEY, McNENNY & FARRINGTON
Donald W. Farrington
ATTORNEYS Dec. 3, 1963

J. F. NORTON 3,112,758

BALL VALVE

Filed Jan. 6, 1961

INVENTOR.
JAMES FREDERICK NORTON
BY
RICHEY, McNENNY & FARRINGTON
Donald W. Farrington
ATTORNEYS United States Patent Office 3,112,758
Patented Dec. 3, 1963

3,112,758
BALL VALVE
James Frederick Norton, Cleveland, Ohio, assignor to The Weatherhead Company, Cleveland, Ohio, a corporation of Ohio
Filed Jan. 6, 1961, Ser. No. 81,167
13 Claims. (Cl. 137—315)

This invention relates to valves of the type having a valve member which may be turned to open or close the valve, and has particular applicability to ball valves.

Prior to the present invention such valves have been so constructed that their assembly was unnecessarily time-consuming and required careful attention and skill. The present invention is directed to an improved valve of this general type having a novel construction which enables it to be assembled quickly, economically, and without requiring as much skill and attention as previous valves of this general type.

In accordance with the present invention, a valve is provided having a rotatable stem constructed and arranged to have its inner end inserted from outside the valve housing into the interior thereof and a rotatable valve member adapted to be inserted endwise into the housing and having means for interlocking with the inner end of the stem as a result of such endwise insertion. With this novel arrangement the stem and the valve member become interlocked in such a manner that each is held in the proper position by the other and neither can become detached or improperly positioned inadvertently. After the valve member and the stem have been coupled together, a stop is provided which coacts with the stem to limit the movement of the valve member between a valve-open position and a valve-closed position.

It is an object of this invention to provide a novel and improved valve of the type having a rotatable valve member for opening and closing the valve.

Further objects and advantages of this invention will be apparent from the following detailed description of several presently-preferred embodiments thereof, which are shown in the accompanying drawings.

In the drawings:

FIGURE 1 is an axial section through a ball valve in accordance with a first embodiment of the present invention, showing the position of the parts when the ball valve member is being inserted endwise into the valve housing;

FIGURE 2 is an axial section of the rotatable valve stem, taken along the line 2—2 in FIG. 1;

FIGURE 3 is a vertical cross-section of the ball valve member, taken along the line 3—3 in FIG. 1;

FIGURE 4 is a top plan view of the ball valve member after it has been assembled to the stem and before the stem has been turned;

FIGURE 5 is an axial section of the valve after the ball valve member has been assembled to the stem and they have been turned to the valve-open position;

FIGURE 6 is a top plan view of the valve in its valve-open position, as shown in FIG. 5;

Figure 7:
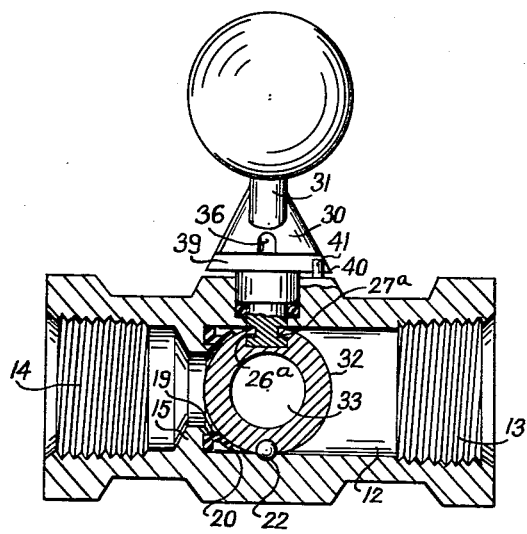
FIGURE 7 is an axial section of the valve in its valve-closed position.
Figure 8:
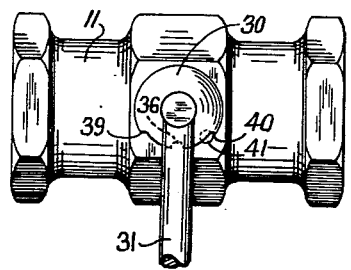
FIGURE 8 is a top plan view of the valve in its FIG. 7 position.

Referring first to FIG. 1, the valve shown therein comprises a one-piece housing 11 having a cylindrical chamber 12, a threaded inlet passage 13 at one end leading into chamber 12 and in axial alignment therewith, and a threaded outlet passage 14 at the opposite end. Between its chamber 12 and its outlet passage 14 the valve housing is formed with an integral, annular, internal shoulder 15 which terminates in a generally cylindrical flange 16 facing toward the chamber 12. This flange 16 has a tapered end face 17.

A deformable, resilient, annular seal member 18 is snugly mounted on the outside of the flange 16. As shown in FIG. 1, this seal member has an annular, radially projecting flange 19 at its back end which abuts against the front face of the shoulder 15. The outer circumference of flange 19 is spaced slightly from the cylindrical wall of the valve chamber 12. The seal member 18 also presents a forwardly projecting annular lip 20 which projects well beyond the end face 17 on the valve housing flange 16 and is readily flexible and stretchable. Preferably, the seal member 18 is formed of Teflon or other suitable material having equivalent properties.

Beyond the front end of the seal 18 the valve housing or body 11 is formed with a small, internal, semi-spherical recess 21 facing radially into the valve chamber 12. A spherical bearing ball 22 rests in this recess.

Diametrically opposite the bearing ball 22 the valve housing is formed with a radial bore 23 which opens into the valve chamber 12. A cylindrical counterbore 24 extends from the bore 23 to the outside of the valve housing.

The valve is provided with a rotatable stem having an inner end portion 25 of cylindrical outline which is dimensioned to be inserted slidably into the bore 23 from outside the valve housing radially into the valve chamber 12. Inside the valve chamber the inner end portion of the valve stem has a reduced neck at which are located a pair of diametrically oppositely positioned slots 26 and 27 which are open at the periphery of the stem. These slots have flat, parallel bottom walls 26a and 27a, respectively (FIG. 2), which extend parallel to the axis of the valve housing 11 in the position of the stem as shown in FIG. 1, before the ball valve member 32 is coupled to the stem.

Outwardly beyond its inner end portion 25 the valve stem has a larger diameter cylindrical portion 28, which has a rotatable fit in the counterbore 24 in the housing. An O-ring 29 is engaged between the inner end of counterbore 24 and the inner end of the valve stem portion 28.

Outwardly beyond the housing the valve stem has an enlarged head 30, to which is threadedly connected a handle 31 for turning the valve stem.

The turnable valve member is a ball 32 having a relatively large axial passage 33 extending therethrough. The ball 32 is shaped and dimensioned to be slidably insertable endwise through the inlet passage 13 into the valve member 12. At its upper end in FIG. 1 the ball 32 is formed with an inverted T-shaped slot 34 which is open at the inner end 32a of the ball as the latter is being inserted into the valve chamber 12, as shown in FIG. 1. The opposite end of this slot is closed and presents an arcuate shoulder 34c. The bottom of the slot 34 in the ball valve member is shaped and dimensioned to receive the cylindrical lower end of the stem, while the narrower upper end of slot 34 is shaped and dimensioned to snugly, but slidably, receive the slotted portion of the valve stem.

With this arrangement, the valve member 32 may be slid endwise into the chamber 12 to a position in which it is coupled to the lower end of the stem as shown in FIG. 4. The flats 26a and 27a on the stem are engaged by the opposite sides 34a and 34b of the reduced upper end of the slot 34, so that when the stem is turned the ball valve member 32 will turn with it. The shoulder 34c at the closed end of slot 34 is engaged by the lower end of the valve stem, which provides a stop for the ball valve member when the latter is inserted.

The ball valve member 32 also is formed at the bottom with a lengthwise slot 35 which is open at the inner end 32a of the ball valve member in FIG. 1 and which is adapted to ride over the bearing ball 22. The opposite end of this slot is closed, presenting a shoulder 35a thereat for engagement with the bearing ball 22.

When the ball valve member 32 is fully inserted it deforms the projecting annular lip 20 of the seal 18, so that this lip conforms snugly to the periphery of the ball valve member.

After having been coupled together, as described, the valve stem and the ball valve member may be turned 180° to the position shown in FIG. 5. In this position, the shoulder 34c at the inner end of the upper slot 34 in ball valve member 32 abuts against the lower end of the stem and the shoulder 35a at the inner end of the bottom slot 35 in the ball valve member engages the bearing ball 22. Accordingly, in this position the ball valve member 32 cannot be withdrawn from the valve chamber 12 back through the inlet 13. The stem positions the ball valve member both radially and lengthwise of the valve housing. The ball valve member positions the stem radially of the valve housing.

Figure 9:
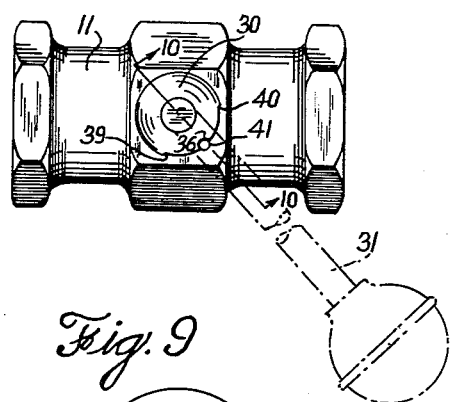
FIGURE 9 is a top plan view of the valve showing the position of the valve stem at which the stop pin may be inserted in place on the valve housing.
Figure 10:
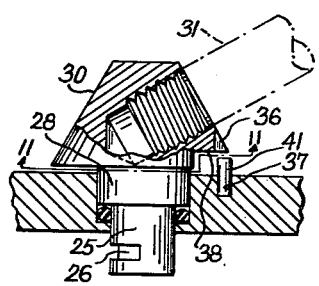
FIGURE 10 is a fragmentary vertical section taken along the line 10—10 in FIG. 9.
Figure 11:
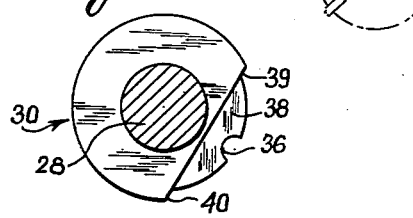
FIGURE 11 is a section taken along the line 11—11 in FIG. 10 and showing the underside of the head on the valve stem.

Referring to FIGS. 9 and 10, the enlarged head 30 on the upper end of the valve stem is generally frustoconical. At one side it has a semi-circular, vertical slot 36 which is adapted to be positioned in registration with a recess 37 (FIG. 10) in the outside of the valve housing. Below this opening 36 the head 30 on the stem is formed with an undercut at 38 (FIG. 10). At the opposite ends of this undercut the head presents a pair of shoulders 39 and 40 spaced apart somewhat more than 90° angularly about the axis of the stem. With the handle 31 detached from the head 30 on the stem, and with the head positioned as shown in FIGS. 9 and 10, with its slot 36 in vertical alignment with the recess 37 in the valve housing, a stop pin 41 may be inserted down through the slot 36 and into the opening 37. This pin 41 now is positioned in the path of movement of either shoulder 39 or 40 on the head 30 when the stem is turned in one direction or the other. The undercut 38 on the head 30 enables the latter to clear the stop pin 41. When the valve stem is turned counterclockwise from the position shown in FIG. 9 until its shoulder 39 engages the pin 41, the ball valve 32 will be in the fully open position shown in FIG. 5. When the stem is turned clockwise from the FIG. 9 position until its shoulder 40 engages pin 41, the ball valve 32 will be in the fully closed position as shown in FIG. 7. In the illustrated embodiment the stop shoulders 39, 40 enable the stem to be turned 90° between fully open and fully closed positions. However, this angle may be made smaller, if desired.

From the foregoing, it will be apparent that this valve may be assembled quite readily in a fool-proof manner. The valve stem is inserted first radially from outside the valve housing until its inner end is disposed in the valve chamber 12, as shown in FIG. 1. Then the ball valve member 32 is inserted endwise into the valve chamber 12 as shown in FIG. 1 until it is coupled to the lower end of the stem and rests on the bearing ball 25. Thereafter, the valve stem may be turned to the position shown in FIG. 9, so that the stop pin 41 may be inserted into the opening 37 in the top of the valve housing. Thereafter, the handle 31 is threadedly inserted into the head 30 on the valve stem. The stop pin 41 serves to limit the movement of the valve stem and the ball valve 32 to a range of 90° between the open position shown in FIG. 5 and the closed position shown in FIG. 7.

In this valve the stem and the ball valve member are interlocked with one another such that each is held by the other in the proper position. Neither the stem nor the ball valve member can become detached or improperly positioned inadvertently.

Figure 12:
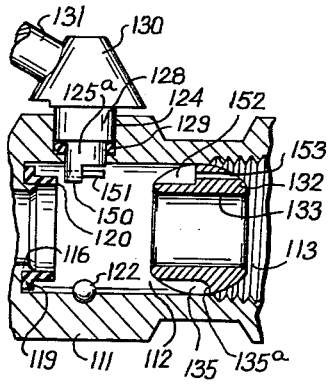
FIGURE 12 is a view similar to FIG. 1 and showing a second embodiment of this invention.

Referring now to FIG. 12, the second embodiment of the present invention is similar in most respects to the first-described embodiment and the corresponding elements are designated by the same reference numerals plus 100.

The rotatable valve stem has a reduced inner end 150 carrying a pin 151, which extends parallel to the axis of the valve housing when the ball valve member 132 is being inserted, as shown in FIG. 12. As in the first embodiment, this inner end of the stem is adapted to be inserted radially from outside the valve housing into the chamber 112 therein.

The ball valve member is formed with a groove or recess 152 at the top which is open at the inner end of the ball valve member and is shaped, dimensioned and positioned to receive the reduced end 150 on the valve stem. Beyond the inner end of this recess 152 the ball valve member is formed with a bore 153 for snugly, but slidably, receiving the pin 151 carried by the valve stem.

In this embodiment, the ball valve member 132 is inserted endwise into the valve chamber 112 until its bore 153 receives the pin 151 and the inner end of its recess 152 abuts against the reduced end 150 of the valve stem. After the valve stem and the ball valve member have been coupled together in this manner, turning of the valve stem causes the ball valve member to turn with it, as in the first embodiment. In other respects the valve of FIG. 12 may be identical to that of FIGS. 1–11.

FIGURES 13–16 show the rotatable valve stem and the ball valve member in a third embodiment of the present invention. In this embodiment the valve housing and other parts may be identical to those in the first-described embodiment.

Figure 13:
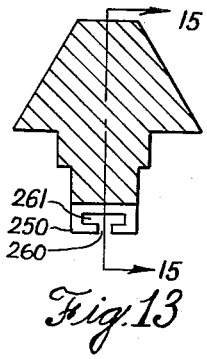
FIGURES 13 and 14 are views corresponding to FIGS. 2 and 3, respectively, and showing the rotatable stem and valve member in a third embodiment of this invention.
Figure 15:
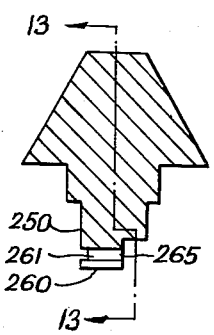
FIGURE 15 is a section taken along the line 15—15 in FIG. 13.

Referring to FIGS. 13 and 15, the valve stem has a reduced inner end 250 having a T-shaped slot with a narrow portion 260 open at the bottom of the stem and a wider portion 261 above, extending laterally on opposite sides of the narrow portion 260. This stem is adapted to be inserted radially from outside the valve housing into the chamber therein in the same manner as the first embodiment.

Figure 14:
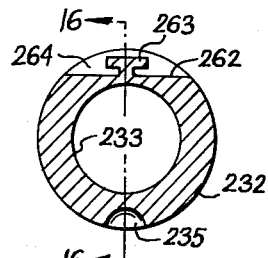
Figure 16:
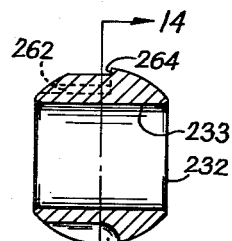
FIGURE 16 is a section taken along the line 16—16 in FIG. 14.

As shown in FIGS. 14 and 16, the ball valve member 232 is cut away at the top to provide a flat surface 262 and a T-shaped segment 263 projecting above the flat surface 262, but not beyond the spherical periphery of the ball valve member. This cut away portion and the T-shaped segment 263 extend about one-half the length of the ball valve member, terminating at a flat transverse shoulder 264 (FIG. 16) in back of which the ball valve member has a generally spherical periphery.

The T-shaped segment 263 of the ball valve member is shaped, dimensioned and positioned to be received snugly, but slidably, in the T-shaped slot 260, 261 in the stem when the ball valve member is inserted endwise into the valve chamber. Such insertion continues until the shoulder 264 on the ball valve member engages a corresponding shoulder 265 (FIG. 15) on the valve stem, after which the valve stem may be turned so as to turn the ball valve member correspondingly.

Figure 17:
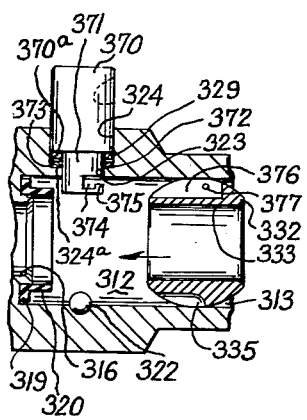
FIGURE 17 is a view similar to FIG. 1 and showing a fourth embodiment of this invention.
Figure 18:
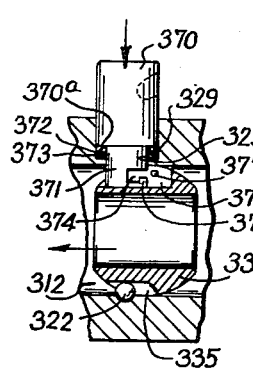
FIGURE 18 is a similar view showing the valve stem and the ball valve member just before they are interlocked.
Figure 19:
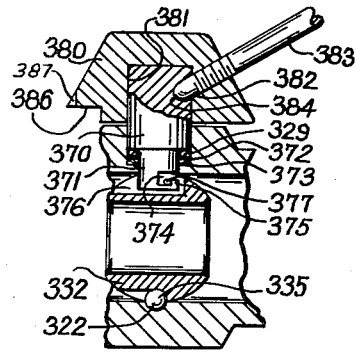
FIGURE 19 is a similar view showing the valve stem and the ball valve member interlocked and showing the head and handle coupled to the outer end of the valve stem.

FIGURES 17–19 show a fourth embodiment of the present invention. In this embodiment, the valve housing is shown as being identical to the housing in the first three embodiments. Corresponding elements are given the same numerals as in FIG. 1, plus 300.

Referring to FIG. 17, the valve stem 370 has a cylindrical upper end which is rotatably received in a counterbore 324 in the valve body. Below its cylindrical upper end the valve stem has a reduced cylindrical inner end portion 371 which is rotatably received in a bore 323 in the valve body which leads into the valve chamber 312. This inner end portion of the stem is adapted to be inserted from outside the valve housing radially into the valve chamber. An O-ring 329 of rubber-like material snugly extends around the reduced portion 371 on the valve stem just below an annular shoulder 370a at the lower end of the upper end portion 370. A flat metal washer 372 engages beneath the O-ring. An annular spring metal washer 373 of undulating or wavy configuration is disposed between washer 372 and an upwardly facing annular shoulder 324a on the valve housing at the lower end of counterbore 324.

At its extreme inner end the valve stem is formed with an L-shaped slot 374 which is open at the periphery of the valve stem. At its right edge in FIG. 16 the valve stem has an upstanding lip 375 above which the slot 374 has its narrowest dimension. The larger inner end of slot 374 extends down behind this lip 375.

The ball valve member 332 is formed at the top with an open-ended slot 376 shaped and dimensioned to receive the inner end of the valve stem. Toward the inner end of this slot the ball valve member has a strap or bail 377 extending across this slot and adapted to be received in the slot 374 in the valve stem.

As shown in FIG. 17 the valve stem normally is biased by the spring washer 373 to a position where the lip 375 is positioned in the path of strap 377 when the ball valve member is inserted endwise into the valve chamber.

As shown in FIG. 18, after the ball valve member has been inserted part way, the valve stem may be pushed in manually, against the bias exerted by spring washer 373, to a position where the strap 377 on the ball valve member can clear the lip 375 on the valve stem. Therefore, the ball valve member 332 may be inserted into the valve chamber until its strap 377 is beyond the lip 375.

Thereafter, the valve stem is released and spring washer 373 moves it outward so that lip 375 on the valve stem projects in front of strap 377. Now, the valve stem and the ball valve member are interlocked, so that the ball valve member can be removed only after first depressing the valve stem.

In order to prevent the valve stem from being depressed after the ball valve member has been interlocked with it, a head and handle assembly as shown in FIG. 19 may be provided. As shown in this figure, the head 380 is generally frusto-conical, having a socket 381 enabling it to be slipped over the upper end of the valve stem. The head has a threaded passage 382 at one side for receiving the screw-threaded inner end of a handle 383. The stem has a recess 384 in its periphery which is aligned with the passage 382 and which receives the inner end extremity of the handle. The bottom 385 of the head 380 has a very slight clearance from the outside of the valve housing.

With this arrangement the handle 383 locks the valve stem to the enlarged head 380. The latter cannot be depressed a substantial amount because of the slight clearance between it and the valve housing. Therefore, the valve stem now cannot be depressed, even deliberately, enough to enable the strap 377 on the ball valve member to disengage from behind the lip 375 on the valve stem.

At the opposite side from the handle 383 the head 380 is formed with an undercut 386, with stop shoulders at the opposite ends, and an opening 387 for the insertion of a stop pin, as in the first embodiment. After the head, stem and ball valve member have been turned 135° from the position shown in FIG. 19, the stop pin is inserted in place on the valve housing. Thereafter the stop pin limits the turning of the ball valve member between an open position (displaced 180° from the position shown in FIG. 19) and a closed position.

From the foregoing description it will be evident that each of the illustrated embodiments is particularly well suited for the accomplishment of the stated purposes of this invention. However, it is to be understood that, while several presently-preferred embodiments have been illustrated and described in detail herein, various modifications, omissions and refinements which depart from the disclosed embodiments may be adopted without departing from the spirit and the scope of this invention. For example, in each embodiment the rotatable valve member may be other than ball shaped, if desired.

What is claimed is:

1. A valve comprising a housing having a chamber therein and inlet and outlet passages leading to and from said chamber, a rotatable stem extending from outside said housing into said chamber, said housing having a transverse opening leading into said chamber and receiving said stem, said stem having an inner end portion which is shaped and dimensioned to be inserted from outside said housing through said opening into said chamber, and a rotatable valve member in said chamber coupled to said inner end portion of the stem to be turned thereby, said valve member being shaped and dimensioned to be inserted endwise into said chamber and having a slot in its periphery which is open at one end to receive said inner end portion of the stem when the valve member is inserted endwise into said chamber, said slot being closed at the other end to form an abutment adapted to limit relative movement of said stem and said valve member in one direction lengthwise of said slot, said valve member and said inner end portion of the stem having means for interlocking engagement with each other to retain said stem against outward movement through said transverse opening.

2. A ball valve comprising a one-piece housing having a ball-receiving chamber and inlet and outlet passages extending from said chamber at opposite ends thereof, said inlet passage being larger in cross-section than said outlet passage, said housing having a radial opening leading into said chamber, a rotatable stem extending from outside said housing radially into said chamber, said stem having an inner end portion which is shaped and dimensioned to be inserted from outside the housing slidably through said opening radially into said chamber, and a ball valve member in said chamber coupled to said inner end portion of the stem to be turned by the stem, said ball valve member being shaped and dimensioned to be inserted endwise through said inlet passage into said chamber and having a slot in its periphery which is open at one end to slide past and receive said inner end portion of the stem when the ball valve member is inserted endwise into the chamber, said slot being closed at the other end to form an abutment adapted to limit relative movement of said stem and said valve member in one direction lengthwise of said slot, said stem and said ball valve member when coupled together having interengaging portions which interlock them to each other to retain said stem against outward movement through said radial opening.

3. A ball valve comprising a housing having a ball-receiving chamber and inlet and outlet passages extending from said chamber at opposite ends thereof, said housing having a radial opening leading into said chamber, a rotatable stem extending from outside said housing through said opening into said chamber, said stem having an inner end portion which is shaped and dimensioned to be inserted from outside the housing slidably through said opening radially into said chamber, and a ball valve member in said chamber coupled to said inner end portion of said stem to be turned by the stem, said ball valve member being shaped and dimensioned to be inserted endwise into said chamber through one of said passages and having a slot in its periphery which is open at one end to slide past and receive said inner end portion of the stem when the ball valve member is inserted endwise into the chamber, said slot being closed at the other end to form an abutment adapted to limit relative movement of said stem and said ball valve member in one direction lengthwith of said slot, said ball valve member and said stem interlocking with each other at said inner end portion of the stem to fix said stem against outward movement through said radial opening.

4. The ball valve of claim 3 wherein said slot in the ball valve member is a T-shaped slot having a narrow outer portion which is open along its entire length at the periphery of the ball valve member and a wider portion at the inside of said narrow portion which is open only at said one end, and said stem has a reduced neck which is received in said narrow portion of the slot and a larger inner end portion which is received in said wider portion of the slot.

5. The ball valve of claim 3 wherein the slot of said ball valve member is defined by a T-shaped segment and slots at each side of said T-shaped segment which are open at one end of the ball valve member, and said stem has a T-shaped slot at its inner end which is open to receive the T-shaped segment on the ball valve member when the latter is inserted endwise into the chamber, said slots in the ball valve member being closed at their opposite ends for engagement against the stem.

6. The ball valve of claim 3 wherein said ball valve member has a shoulder at the opposite end of said slot and a bore extending past said shoulder, and said stem has a shoulder engaging said shoulder at the opposite end of the slot and a pin extending beyond the stem shoulder and received snugly in said bore.

7. The ball valve of claim 3 wherein said ball valve member has a strap extending across said slot, and said stem has its inner end received in said slot in the ball valve member, said stem having a slot adjacent its inner end which is open at one side of the stem to receive said strap on the ball valve member when the latter is inserted endwise into the valve chamber, said stem having a lip projecting behind said strap to retain the ball valve member interlocked with the valve stem.

8. A ball valve comprising a one-piece housing with a ball-receiving chamber therein and inlet and outlet passages leading to and from said chamber, said inlet passage being larger in cross-section than said outlet passage, said housing having a radial opening leading into said chamber, a rotatable stem extending from outside said housing through said opening radially into said chamber, said stem having an inner end portion which is insertable from outside the housing radially into said chamber through said opening, a ball valve member in said chamber coupled to the inner end of said stem to be turned thereby, said ball valve member being shaped and dimensioned to be inserted endwise through said inlet passage into said chamber, said ball valve member having a T-shaped slot in its periphery with a narrow outer portion which is open along its entire length at the periphery of the ball valve member and a wider portion at the inside of said narrow portion which is open only at one end of the ball valve member, said stem at its inner end portion having a non-circular reduced neck which is received snugly in said narrow portion of the slot and a larger inner end extremity which is received in said wider portion of the slot, said ball valve member being slidable over said inner end portion of the stem when inserted endwise into said chamber with said open end of said slot toward the stem, said slot being closed at its opposite end for engagement with said stem to thereby prevent the withdrawal of the ball valve member through said one passage after the ball valve member has been turned about the axis of the stem from the angular position which it had during its insertion into said chamber, a bearing ball in said chamber diametrically opposite said radial opening in the housing, said ball valve member having a second slot in its periphery which is located at the opposite side from the T-shaped slot and is open at said one end of the ball valve member to receive said bearing ball when the ball valve member is inserted endwise through said inlet passage into the chamber, said second slot being closed at its opposite end to engage said bearing ball and prevent the withdrawal of the ball valve member through said inlet passage after the ball valve member has been turned from the angular position which it had during its insertion into said chamber, said housing having a recess at the outside at one side of said radial opening, a stop pin seated in said recess and projecting outwardly beyond said housing, said stem at the outside of said housing having an enlarged head with a portion which overlies said stop pin, said head having an undercut beneath said overlying portion for receiving the projecting stop pin and having stop shoulders at opposite ends of said undercut for engagement with the stop pin to limit the turning of said stem in opposite directions, and said overlying portion of the head having an opening between said stop shoulders which registers with said recess in the housing in one angular position of the stem to permit the insertion of said stop pin through said last-mentioned opening into said recess in the housing after said inner end portion of the stem has been inserted into the housing.

9. A valve comprising a housing having a chamber therein and first and second passages leading to and from said chamber, said housing having a radial opening extending into said chamber, a rotatable stem extending from outside said housing through said radial opening into said chamber, said stem having an inner end portion which is shaped and dimensioned to be inserted from outside said housing through said opening into said chamber, a rotatable valve member in said chamber, said rotatable valve member and said housing being dimensioned so as to allow said rotatable valve member to be inserted into said chamber through one of said passages, said stem and said valve member having interlocking means engageable with each other by movement of said valve member into said chamber through said one passage, said interlocking means securing said stem against radial movement outward through said radial opening, said interlocking means including abutment means between said stem and said valve member limiting movement of said valve member along said one passage in one direction with respect to said stem, said interlocking means allowing said stem and said valve member to engage in interlocking relationship when said stem is in one position with respect to rotation about its axis, said interlocking means being constructed and arranged whereby rotation of said valve member and said stem by rotation of said stem of substantially one-half of one revolution about its axis causes said abutment means to engage to positively prevent movement of said valve member outward through said one passage.

10. A valve as set forth in claim 9 including seal means mounted in said housing at the junction of the other of said passages and said chamber, said seal being adapted to engage the surface of said valve member around said other passage to prevent flow of fluid between said other passages and said chamber when said valve member is in a position to close off said other passage.

11. A valve as set forth in claim 9 including bearing means on said housing in said chamber in radial alignment with said radial opening to pivotally engage said valve member for pivotal bearing support along the axis of said valve stem.

12. A valve as set forth in claim 11 wherein said bearing means is engageable by said valve member when said valve member is inserted into said housing into interlocking engagement with said stem, said bearing means serving as a support to secure said valve member against movement outward through said one passage after said stem has been rotated said half revolution to secure said valve member within said chamber, whereby said valve member is secured at opposed points along the axis of said stem against movement outward through said one passage after said stem has been rotated one half revolution from said interlocking engagement position.

13. A valve as set forth in claim 10 wherein said other passage has a reduced diameter portion adjacent said chamber and said seal member is secured on said housing at said reduced diameter portion whereby said seal and said reduced portion serve as positive stop means to prevent further movement of said valve member in the direction of its insertion through said one passage during assembly of the valve.

References Cited in the file of this patent

UNITED STATES PATENTS

| | | |
|---|---|---|
| 1,784,381 | O'Stroske | Dec. 9, 1930 |
| 1,973,418 | Sibley | Sept. 11, 1934 |
| 2,653,790 | Bowan | Sept. 29, 1953 |
| 2,929,406 | Anderson | Mar. 22, 1960 |
| 2,994,341 | Leopold | Aug. 1, 1961 |
| 2,995,336 | Usab | Aug. 8, 1961 |
| 3,009,680 | Kaiser | Nov. 21, 1961 |
| 3,056,577 | Kulisek | Oct. 2, 1962 |

FOREIGN PATENTS

| | | |
|---|---|---|
| 799,339 | Great Britain | of 1958 |